US008862307B2

(12) United States Patent
Pettersson et al.

(10) Patent No.: US 8,862,307 B2
(45) Date of Patent: Oct. 14, 2014

(54) STEERING AND CONTROL SYSTEM FOR A VEHICLE FOR THE DISABLED

(75) Inventors: Ola Pettersson, Örebro (SE); Erik Wästlund, Karlstad (SE); Kay Sponseller, Karlstad (SE)

(73) Assignee: Eyego Ab, Karlstad (SE)

( * ) Notice: Subject to any disclaimer, the term of this patent is extended or adjusted under 35 U.S.C. 154(b) by 399 days.

(21) Appl. No.: 13/266,022

(22) PCT Filed: May 5, 2010

(86) PCT No.: PCT/SE2010/050495
§ 371 (c)(1),
(2), (4) Date: Nov. 9, 2011

(87) PCT Pub. No.: WO2010/128941
PCT Pub. Date: Nov. 11, 2010

(65) Prior Publication Data
US 2012/0046821 A1 Feb. 23, 2012

(30) Foreign Application Priority Data

May 5, 2009 (SE) ...................... 0950302

(51) Int. Cl.
*G01C 22/00* (2006.01)
*A61G 5/10* (2006.01)
*G06K 9/00* (2006.01)
*G06K 9/46* (2006.01)
*G01C 21/20* (2006.01)
*A61G 5/04* (2013.01)

(52) U.S. Cl.
CPC .......... *A61G 5/04* (2013.01); *A61G 2005/1051* (2013.01); *G01C 21/20* (2013.01); *A61G 2203/14* (2013.01); *A61G 5/10* (2013.01); *A61G 2203/20* (2013.01)
USPC ................ 701/25; 701/41; 382/118; 382/190

(58) Field of Classification Search
None
See application file for complete search history.

(56) References Cited

U.S. PATENT DOCUMENTS 3,712,716 A * 1/1973 Cornsweet et al. ........... 351/210
5,410,376 A * 4/1995 Cornsweet et al. ........... 351/210
(Continued)

FOREIGN PATENT DOCUMENTS

WO 2005119554 A2 12/2005

OTHER PUBLICATIONS

International Search Report and Written Opinion (mailed Aug. 26, 2010).
(Continued)

*Primary Examiner* — Mussa A Shaawat
(74) *Attorney, Agent, or Firm* — Jeffrey S. Melcher; Manelli Selter PLLC

(57) ABSTRACT

The present invention relates to a control system comprising at least one unit for operating the steering or navigation of a mobile assistive device for disabled persons, wherein said control system is adapted to be connectable to an existing assistive device for disabled persons.

12 Claims, 1 Drawing Sheet

(56) References Cited

U.S. PATENT DOCUMENTS

| | | | |
|---|---|---|---|
| 5,802,220 A * | 9/1998 | Black et al. | 382/276 |
| 5,926,251 A * | 7/1999 | Okumura | 351/209 |
| 6,141,034 A * | 10/2000 | McCutchen | 348/36 |
| 6,320,610 B1 * | 11/2001 | Van Sant et al. | 348/143 |
| 6,401,050 B1 * | 6/2002 | Cooke et al. | 702/127 |
| 6,637,883 B1 * | 10/2003 | Tengshe et al. | 351/210 |
| 6,842,692 B2 * | 1/2005 | Fehr et al. | 701/23 |
| 7,043,056 B2 * | 5/2006 | Edwards et al. | 382/103 |
| 7,383,107 B2 * | 6/2008 | Fehr et al. | 701/25 |
| 7,689,010 B2 * | 3/2010 | Canzler et al. | 382/118 |
| 2003/0127261 A1 * | 7/2003 | Borroni-Bird et al. | 180/65.1 |
| 2003/0169907 A1 * | 9/2003 | Edwards et al. | 382/118 |
| 2004/0006422 A1 | 1/2004 | Fehr | |
| 2004/0103111 A1 * | 5/2004 | Miller et al. | 707/102 |
| 2004/0220704 A1 | 11/2004 | Lin | |
| 2004/0227699 A1 * | 11/2004 | Mitchell | 345/44 |
| 2006/0153430 A1 * | 7/2006 | Canzler et al. | 382/118 |
| 2008/0228384 A1 | 9/2008 | Erickson | |

OTHER PUBLICATIONS

Barea, System for Assisted Mobility Using Eye Movements Based on Electrooculography, IEEE Transactions on Neural Systems and Rehabilitation Engineering, vol. 10, No. 4, Dec. 2002.

Lin, Powered Wheelchair Controlled by Eye-Tracking System, Optica Applicata, vol. XXXVI, pp. 401-412, 2006.

European Search Report issued Apr. 8, 2013 in corresponding European Patent Application No. 10772342.1.

Holly, et al.,"Wheelesly: A robotic wheelchair system: Indoor navigation and user interface," Assistive Technology and Artificial Intelligence, Jan. 1, 1998, vol. 1458, pp. 256-268.

Martin, et al., "Gaze-controlled driving," Proceedings of the 27th International Conference Extended Abstracts on Human Factors in Computing Systems, Chi Ea '09, Apr. 4, 2009, p. 4387.

Matsumoto, et al., "Development of intelligent wheelchair system with face and gaze based interface," Robot and Human Interactive Communication, 2001, Sep. 18-21, 2001, Piscataway, NJ, pp. 262-267.

* cited by examiner

STEERING AND CONTROL SYSTEM FOR A VEHICLE FOR THE DISABLED

CROSS-REFERENCE TO RELATED APPLICATIONS

This application is a national stage entry under 35 U.S.C. 371 of International Application No. PCT/SE2010/050495, filed 5 May 2010, designating the United States. This application claims foreign priority under 35 U.S.C. 119 and 365 to Swedish Patent Application No. 0950302-0, filed 5 May 2009. The complete contents of these applications are incorporated herein by reference.

TECHNICAL FIELD

The present invention relates to a control system comprising at least one unit for operating the steering or navigation of a mobile assistive device for disabled persons.

STATE OF THE ART

Today, there are few possibilities for persons with major motor, cognitive and/or communicative function disturbances to move independently. Usually, electric wheelchairs are used, wherein the user controls the wheelchair with a control means, for example a joystick or a suck and blow system where the user uses the mouth to steer, or wherein an attendant drives the wheelchair to the location desired by the user.

In the present situation, for a more advanced navigation, mainly systems for track guidance of electric wheelchairs are available, where a line is marked on the floor and the wheelchair can follow this line along a track. In this way, a longer journey is enabled without requiring the user to guide in detail, but at the same time one is limited in principle to the track and it becomes difficult to select new routes or to handle an emerging obstacle which has been placed on the track by accident. If the track sensor has difficulties in detecting the track there is also the risk that the wheelchair derails, which increases the risk of accidents and requires monitoring and maintenance of the track. Furthermore, it is impossible to navigate in this way in an unfamiliar location, since a pre-marked route in the form of the track in the floor is needed.

One example of such track guidance systems is available from the manufacturer Permobil, which developed a track guidance system for electric wheelchairs in the 1980ties. This system was based on an optical sensor detecting a reflective tape being glued to the floor. However, Permobil has had difficulties in combining their track system with the latest generation of electric wheelchairs. Another example consists of the Akka platform, which is a mobile platform where the user's own manual wheelchair can be placed. Also this can be track-guided and equipped with an optical sensor detecting a reflective tape on the floor.

Both above-mentioned systems have their limitations with respect to wear of tape, furnishing, aesthetic and physical design of the environment. For instance, relatively large, smooth turns are required for efficient and reliable detection, which rules out cramped environments. The consequence is that the user is restricted only to adapted environments, and in all other situations the user has to be accompanied by a person able to cope with the surrounding world. This means a significant reduction of the quality of life for the wheelchair-bound person who to a great extent becomes dependent on help from another person, and thereby is limited in his/her independent movement.

In the case when the user, in addition, has motor and/or cognitive functional impairments affecting the ability to operate a joy stick unit or a blow and suck system, the control is made even more difficult. The user may get tired quickly and not be capable of indicating each change of direction which is desired, or have difficulty in understanding the instructions which can be given to the steering system. Thereby, an efficient use of the wheelchair is made impossible, and often the presence of an accompanying person is required, which in its turn means that the possibility to get on independently and decide over one's own movement is strongly restricted.

The problem that the use of a control unit is difficult or impossible for a user with motor problems can be solved by using a wheelchair controlled, for example, by eye movements or voice commands. Such a technique is shown by W02005119554 (Levy et al.), and can certainly make it considerably easier for a user having only motor functional impairments, but if also the cognition ability is impaired, the technique can only be used to a limited extent or not at all. Furthermore, there is no other way to adapt a wheelchair to a specific user's needs than to special order the wheelchair from the beginning, something which becomes unreasonably expensive.

Therefore, there is a great need for an assistive device for disabled persons which can make everyday life easier for users with cognitive functional impairments and increase the independence of wheelchair-bound persons.

BRIEF DESCRIPTION OF THE INVENTION

It is an object of the present invention to, eliminate, or at least minimize, the above-mentioned problems, which is achieved by means of a steering and control system, wherein said system is adapted to be connected to a mobile assistive device for disabled persons, such as a wheelchair or an AKKA platform, in such a way that transfer of information can take place between said steering and control system and said assistive device for disabled persons, wherein the system is also designed to be adaptable to different control routines. In this way, a steering and control system which is adapted to the specific needs of a user can be connected to an existing assistive device for disabled persons, so that a standard, product, by means of this addition, can be specially adapted to a person's cognitive and motor abilities, and make this person's transportation and independent movement easier.

According to one aspect of the invention, said system comprises a control unit for eye control. In this way, a user with motor and/or cognitive difficulties making the use of other control systems, for example joy stick control, difficult, can control the assistive device for disabled persons solely by fixing his/her gaze on given fields on a display, and, depending on the desired complexity of the system, more simple or complex movements can be achieved by means of such eye control.

According to another aspect of the invention, said means for eye control further comprises means for image recording adapted to record at least one image of an environment around the assistive device for disabled persons, suitable for projection on the display. In this way, the user can have a view of the environment and will have it easier to understand the relationship between a direction indicated in a symbol field and the actual direction in which a movement would occur.

According to another aspect of the invention, a separate joy stick unit and a switch are provided, wherein the control of the system can be switched between this joy stick unit and the eye control unit. In this way, it becomes possible for another person than the user, for example an attendant, a friend or a relative, to take over the control of the assistive device for disabled persons when needed, either to prevent a potentially undesired situation where the user might lose control of the assistive device, or to reduce the burden on the user by taking over the control during part of or the entire journey. This can also function as a safety system, enabling an external intervention if a dangerous or unwanted situation should occur.

According to another aspect of the invention, the control system further comprises a navigation unit with at least one sensor for detecting objects in the environment and a memory unit adapted to identify the position of the assistive device based on the objects detected by the sensor. In this way, it becomes possible for the assistive device to act on its own based on a complex instruction, so that a movement to a desired position is achieved, and so that the journey to this position passes without colliding with surrounding objects or getting lost so that the system loses knowledge of its position. This can reduce the burden on the user even further, who after indicating a desired destination can relax during the journey thereto, without having to instruct the system about every step along the way. The user can still intervene if the journey should be interrupted, or if a journey to another destination is desired, but if nothing else happens, the navigation unit itself continues to control the assistive device.

According to a further aspect of the invention, the memory unit is further adapted to memorize a number of given positions and to calculate a suitable route from the present position of the assistive device for disabled persons to one of the given positions. In this way, the best route can be selected, perhaps along a wall or across a floor surface, and the position of stationary obstacles such as furniture can be taken into account in the calculation of the route. It is also conceivable to select a number of stations along the route before the final destination is reached, so that the assistive device moves along a course chosen by the user and which can be reselected in any given situation. By being familiar with obstacles such as walls, furniture and the like, the system can avoid collisions, but should an obstacle still get in the way, the system itself can easily brake or turn, thanks to the detection taking place at the sensor and which can discover this type of obstacles.

According to a another aspect of the invention, said navigation unit further comprises a position unit, connected to the memory unit, for determining the position of the control system relative to the environment. In this way, a further level of complexity can be achieved, wherein the user can freely select a destination based on a map image or an address, and the assistive device can navigate there by itself along a route determined to be the most suitable one. Thanks to the fact that an approximate position can be determined without having to relate to familiar objects in the local environment, good navigation can also be achieved outdoors in, for example, an urban environment, so that the user can visit new environments and still handle the navigation and steering of the assistive device in a simple and practical manner.

According to a further aspect of the invention, said navigation unit further comprises an input apparatus connected to the memory unit, wherein said input apparatus is adapted to receive instructions about a given position stored in the memory unit. In this way, the user can indicate the desired destination, either by means of an input apparatus with symbols that can be pressed, a so-called touch screen, by means of joy stick control, or by means of eye control, for instance. If this is convenient for the user, the herein described eye control system can be connected to the navigation unit, so that both these systems are integrated and controlled via the same display where the gaze point of the user is detected.

BRIEF DESCRIPTION OF THE FIGURES

In the following, the invention will be described in more detail with reference to the appended figures of the drawings, in which:

FIG. 3b shows a schematic view of an alternative embodiment of the display of FIG. 3a.

DETAILED DESCRIPTION OF THE FIGURES

Figure 1:
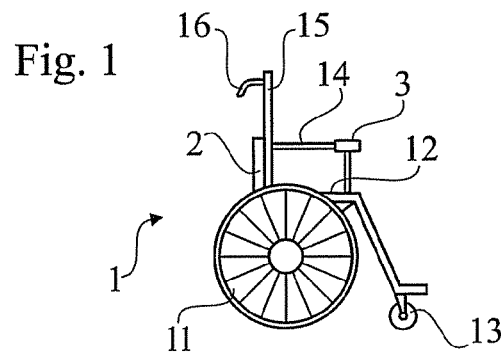
FIG. 1 shows an overview of a mobile assistive device for disabled persons.

FIG. 1 shows an overview of a mobile assistive device for disabled persons, such as a wheelchair 1, comprising wheels 11, seat 12, foot rests 13, arm rests 14, and back rest 15, for supporting and facilitating the positioning of a user in the chair. In case the user does not move and control the movement on his/her own, for example by manually rotating the wheels, a steering system 2 is mounted on the assistive device and designed to be capable of driving the wheels 11. In conventional electric wheelchairs 1, the user can steer by having at his/her disposal a control unit, for example a joy stick unit 3, which is positioned so that the user can easily reach it, for example adjacent to the arm rest 14, and which is connected to the steering system 2. When the user wants the wheelchair 1 to move in a specific direction, he or she can give the control system 2 instructions to that effect by moving a joy stick of the joy stick unit 3, and the thus generated signal is interpreted by the steering system 2 and brings about a movement of the wheels 11.

In case another person than the user himself/herself, for example a friend, a relative or an attendant, should be able to move and control the wheel chair 1, there are handles 16 available, for example adjacent to the back rest 15, so that a simple and manageable control is made possible.

Figure 2:
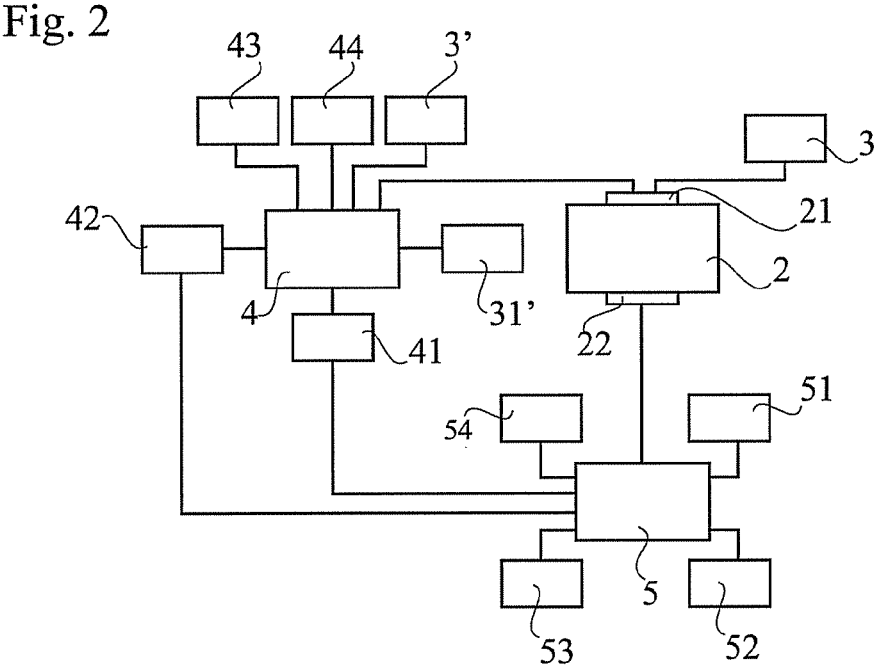
FIG. 2 shows a schematic view of a steering system, for a mobile assistive device for disabled persons, equipped with control and navigation units according to a preferred embodiment of the present invention.

FIG. 2 shows a schematic view of a steering system 2, for a mobile assistive device 1 for disabled persons, equipped with control and navigation units 4, 5 according to a preferred embodiment of the present invention, wherein the steering system and the control and navigation units 4, 5 together constitute a steering and control system 2, 4, 5. The steering and control system 2, 4, 5 is adapted to be connectable to said mobile assistive device 1 for disabled persons, such as a wheelchair or another mobile platform, in such a way that electronic transfer of information can take place between said steering and control system 2, 4, 5 and said assistive device 1 for disabled persons. It is appreciated here that the steering and control system 2, 4, 5 and the assistive device for disabled persons can be set in connection with each other according to any method known per se, wherein interconnection, for example, could be achieved via a physical wire, or via wireless transmission in the form of, for example, radio waves, IR signals or another suitable signal transmission.

According to the embodiment shown in FIG. 2, the steering system 2 comprises connectors 21, 22 to which external units can be connected. In known steering systems with joystick control, as described above, there is generally at least one connector 21 intended for connecting said joystick unit 3, and a control unit 4 for eye control can be is connected to the same connector 21 instead of said joy stick unit 3.

In case the user, for example due to impaired mobility or impaired cognitive function, has difficulty in handling a joy stick himself/herself, a system responding to eye movements means a substantial improvement, and increased possibilities for this user to control his/her forward motion by himself/herself and to move independently. Said control unit 4 for eye control comprises a display 41, where at least one, preferably at least two, more preferably four symbols, for example representing different available directions of movement for the wheelchair 1, are displayed. The control unit 4 also comprises means 42 for detecting a gaze point of the user, i.e. the specific point the user has fixed his/her gaze on, and for determining whether this gaze point is within the boundaries of a symbol on the display 4 or not. Interpreting means 43, for example in the form of a software program in the control unit 4, programmed according to a specific control routine, converts this information into a signal giving an instruction regarding the movement commanded by the user via the eye signal, and forwards this instruction to the steering system 2. Thanks to the connection via the same connector 21 as is intended for a joy stick unit 3, and thanks to the design of the control unit 4 itself (e.g. that it can be adapted to different control routines), this can be connected to an existing steering system without having to make any significant modifications. The steering system 2 generally interprets the newly connected control unit 4 as if it were the joy stick unit 3, and can therefore respond as reliably and in as a controlled way to eye control signals as it normally does to joy stick signals.

To further make it easier for a user with impaired cognitive ability, a means for image recording, for example a camera 44, can be provided for the control unit 4 and record an image, in the form of a still image or moving images, of the area located in the planned direction or directions of movement of the wheelchair 1. This image can then interact with the symbol fields of the display 41 in such a way, for example by superimposition, that the user can fix his/her gaze on a direction on the display and see it both as a symbol indicating a certain direction, as well as an image of the portion of the environment in which the wheelchair 1 would move if the gaze were fixed on the associated symbol. As also described above, information about the gaze point of the user is converted by an interpreting means 43, comprising control routines programmed for this situation, so that the correct signals are forwarded to the steering system 2. Thanks to a more intuitive system, it is made easier for the user since symbol and actual direction are interrelated, and in order to see where the journey goes, the user can follow this on the display, rather than to have to look up on the environment. The image can also be manipulated to make it even easier for the user, for example by increasing the contrast of the image, reducing the number of colours, reinforcing lines, or marking doors and other known objects in the environment. If a means for image recording such an IR camera or a lidar is used, an image can be generated for the user also in poor light conditions, so that the user does not have to find his/her way to a light switch or otherwise produce light before an independent journey can be made by means of the display and the generated image.

The display 41 can be placed in a position adjacent to the wheelchair 1 where it is easy and comfortable for the specific user to utilize the eye control function. This can mean that the display is positioned in front of or at the side of, low or high, to the left or right, depending on the cognitive abilities and/or the eyesight of the user. Such an installation can be facilitated by means of a simple attachment device.

The design of the control unit 4 can vary depending on the needs of the user and the level of control the control unit 4 may have to exert over the movement of the wheelchair 1.

Figure 3A:
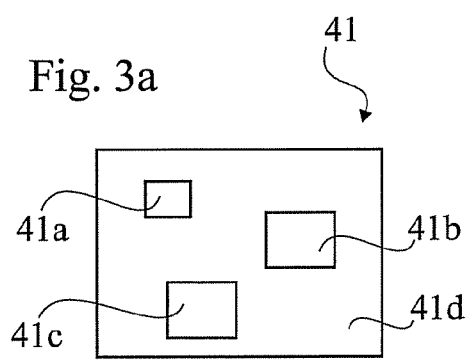
FIG. 3a shows a schematic view of a display of a control unit according to the invention.
Figure 3B:
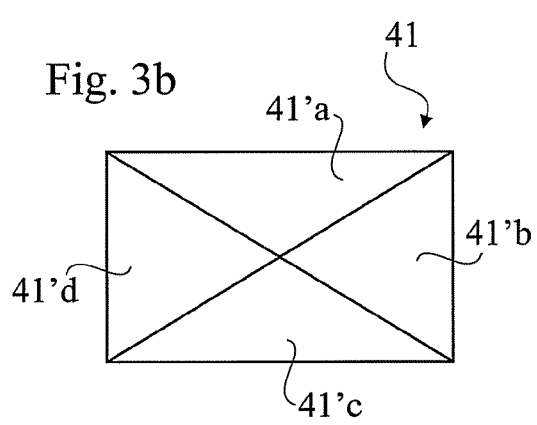

FIGS. 3a and 3b show two examples of preferred embodiments of the display 41 and two different sets of symbol fields: In FIG. 3a, there are three different symbol fields 41a, 41b, 41c, which can be provided with symbols indicating different intended directions of movement. When the gaze point of the user is within the borders of one of these symbol fields, for example 41b, the system will interpret this as if the user wants to move in the direction indicated by the symbol in field 41b. When the user later wants to stop the movement, this can be signalled by moving the gaze point so that it falls outside the symbol field 41b, either by moving it away to a an area 41d around the symbol fields which is outside of the symbol-bearing areas, or completely away from the display, or by transferring the gaze to one of the other symbol fields 41a, 41c, so that the user thus issues a command for movement in another direction.

Alternatively, if the user has a slightly higher cognitive ability, the system can interpret a gaze within a symbol field, for example 41a, as a desire to move, but demand that the user directs the gaze toward the same field 41a again, or toward another symbol field 41b, 41, in order to stop the movement. If the user completely looks away from the display, or looks at an area 41d which in itself does not mean an instruction to the control unit 4, this is thus not interpreted as an instruction to stop the movement.

Which one of these alternative control routines to select can depend on several things, amongst them the ability of the user to interact with the system both cognitively and physically, that is to say both the ability to understand how the system functions and the physical ability to maintain a given gaze direction. For a more highly functional user, there may also be a social advantage in not having to fix his/her gaze on a given point to produce a movement, but instead being able to interact with the environment during the journey and only direct his/her gaze toward the display when a change of the movement is required.

FIG. 3b shows an alternative display configuration where practically the entire area of the display 41 is constituted of symbol fields 41a', 41b', 41c', 41'd. In this way, it can be made easier for the user to direct his/her gaze toward the correct symbol field, since they can be made larger, and by positioning the symbols in a logical manner, for example in the form of arrows, the control unit 4 can be made more understandable for the user.

It is to be understood that the number of symbol fields of the display 41 can be varied depending on the specific user or the surrounding environment. The symbol fields can also be arranged to superimpose to a certain extent, or be combined so that more complex directions can be indicated, or to change during use so that the number of fields and their position are changed depending on the environment.

Thanks to the images that can be recorded with the camera 44, also the control unit 4 can be made more user-friendly, so that the image of the environment is displayed on the display 41 together with suitable symbols in the symbol fields 41a, 41b, 41c or 41a', 41b', 41c', 41d'. In this way, the user can see to where in the room a gaze toward a specific field indicates movement, and does not have to look up from the display 41 to see the where the movement is going.

A plurality of cameras 44 can be provided for the control unit 4 and record different portions of the environment. These can be displayed in different symbol fields or across the entire display 41, based on what is determined to be best for the user's needs.

It is also advantageous that staff assisting the user can control the wheel chair 1, perhaps in situations where the user prefers to rest, or where there is a risk of an accident due to the travel of the wheelchair 1. To fulfill this need, a separate joy stick unit 3' can be arranged next to the control unit 4 together with a switch 31' or the like, allowing the unit 4 to switch between input from the eye control 41, 42, 43, 44 and input from the joy stick 3'. Thus, in this way, a person in the environment of the wheelchair 1 can take over the control of the wheelchair 1 when this is required, and this by positioning both the joy stick 3' as well as the switch 31' so that they are easily accessible to the environment, for example adjacent to the handles 16 or the back rest 15.

It is to be understood that the different components belonging to the control unit 4 can be separate or integrated into the same component, as suitable for the specific application. From the foregoing, it is also evident that the steering and control system 2, 4, 5 is designed to be adaptable to different control routines depending on the specific abilities of an actual user.

To enable a more complex navigation, a navigation unit 5 can be connected to the steering system 2, either in combination with the control unit 4 or independently. Said navigation unit comprises at least one sensor 51 which is designed to sense the environment around the assistive device 1 to be capable of discovering walls or other obstacles or risks, such as for example stairs or doorsteps, and to thereby determine the position of the assistive device 1. Several different types of sensors can be used, e.g. sonar, wherein up to 16 sensors uniformly distributed across the assistive device may be required for determining position, or lidar or cameras, wherein one sensor may be sufficient. The sensors used can measure the distances to obstacles in the environment and, based on this, create a visual picture of what the present position looks like. Thereafter, the navigation unit 5 can compare and match new sensor data with the already stored ones, and in this way determine the position of the assistive device 1.

By interpreting signals from this sensor 51, or a plurality of sensors 51, the navigation unit 5 can generate stop signals to the steering system 2, when an obstacle or danger appears in the wheelchair's path. It is also possible to let the wheelchair 1 follow a given route, such as for example a wall delimiting a room, and to achieve a controlled and predictable movement of the wheelchair 1 in this way. Such instructions, as well as other ones described in greater detail below, can be given by a user by manipulating an input apparatus 52, for example a unit that can be provided with buttons, or a touch-screen, and wherein the desired route can be selected by pushing buttons or symbols. It is also possible to integrate the navigation unit 5 with the control unit 4 for eye control 4 and to let the display 41 used for indicating a direction also be used for these more complex instructions. In this case, the navigation unit 5 can be connected to the steering system 2 via the control unit 4, or directly to the connector 21, and in case said navigation unit 5 is used independently, it can be connected via this connector 21 or via another connecting possibility 22 provided in the steering system 2.

Alternatively, the navigation unit 5 can be combined solely with those components 41, 42 of the control unit 4 that are required to identify the gaze point of a user, and these can be integrated with the unit 5 as a substitute for the input apparatus 52.

The navigation unit 5 can also comprise a memory unit 53 having a pre-programmed representation of the environment of the wheelchair 1, such as for example the room in the user's home where it is located most often. By having knowledge of how the space is shaped and of which walls, stairs or other stationary obstacle's are present, the memory unit 53 can calculate a suitable route to a given point. If the user then wants to drive from a kitchen to a bedroom, thanks to an interaction between the memory unit 53 and the input apparatus 52 (or the display 41 if this is connected to the navigation unit 5) it can be sufficient to indicate the bedroom as destination, so that the wheelchair 1 can find a suitable route and move to the desired location by itself, either by following walls or by movement directly across a floor surface. Known obstacles such as, inter alia, walls can thereby be avoided thanks to the fact that they are previously known to the system. Unexpected obstacles, such as any furniture that has been moved, or closed doors, house pets or persons, can be detected by means of the sensor 51 and the appearance of such an obstacle can trigger an instantaneous stop signal in the navigation unit 5 so that it stops or brakes and tries to find another way around the obstacle. Stationary furniture can of course be pre-programmed into the memory unit 53 so that they are known from the start.

The navigation unit 5 can also estimate the position of the wheelchair 1 itself relative to its environment, for example by recognizing the objects or obstacles identified by means of the sensor or sensors 51 as described above, and this information can be used for calculating the best route between the present position and the desired destination. The speed at which the wheelchair 1 is moving can also be detected in a suitable manner, so that the need of turning and/or braking can be put in relation to how fast a detected obstacle is approaching.

A specific route can be learned in that the assistive device 1 travels along this route, for example in that an attendant drives the assistive device 1 along the desired route, and the system of the navigation unit 5 can then memorize this route and store it in an existing internal map in the navigation unit 5, for example in connection with or integrated with the memory unit 53.

A unit for satellite navigation 54, such as a GPS unit, a GLONASS unit, or a unit that is connectable to another suitable system can also be connected to the navigation unit 5 and be used for determining the position of the wheelchair 1 relative to the environment. Thanks to such a unit 54, the wheelchair 1 can also be navigated outdoors. The user can then easily indicate his/her desired destination, either by using simple symbols representing pre-specified locations, such as the person's home and locations where she or he needs to go frequently, or by indicating an address or pointing on a map. The navigation unit 5 can calculate the best route from the location where it is currently located to the one which is the indicated destination, for example by matching the route with previously learned routes, or by selecting a new route itself, and for example information about where pedestrian crossings are located, or about which sidewalks are the easiest to drive on, can be used to find the best route. Other factors can also be taken into account, and, by adjustment in the navigation unit 5, new factors can be inserted and new criteria for what is to be considered the best option can be used. As described above, the system can learn by itself by evaluating a once driven route, and thus memorize from time to time what the user previously has indicated as suitable routes, desired destinations or particular wishes, so that this can be reused the next time a similar desired destination is indicated. This satellite navigation unit 54 and the sensor 51 can, together or separately, be called a position unit 51, 54 for determining the position of the wheelchair 1 relative to the environment.

When travelling by means of an assistive device 1 for disabled persons and control and navigation units 4, 5 according to the invention, the user should always have the possibility to interrupt the journey or to call for an emergency stop if required.

The use of a wheelchair 1 with control and/or navigation units 4, 5 according to the invention will now be briefly elucidated.

Based on the motor and cognitive abilities of the user, as well as on the needs for independent movement of the user, the unit or units for control and/or navigation which is/are to be used is/are selected and adapted to the specific application. It for example, the user has motor and/or cognitive problems making joy stick control impossible, the eye control unit 4 is better suited, and if independent navigation indoors or in larger areas is desired without requiring the user to control the process in detail, the navigation unit 5 is suitable. Each such unit 4, 5 can then be modified so that the available functions are adapted as closely as possible to the abilities and needs of the user, and thereafter the units 4, 5 are fitted into the steering system 2 of the wheelchair 1, for example by means of an existing connector 21, which is often provided to enable control with a joy stick unit 3. To the units 4,5 can also be connected a control unit 3', for example with joy stick control, which can be mounted on the wheelchair 1 adjacent to the back rest 15 or the handles 16 so that it is easily accessible for an attendant person. The control over the steering system 2 can then be switched between the eye control unit 4 for the user and this second control unit 3' by manipulating a switch 31' which is accessible for the attendant person. Thanks to the fact that the control unit 4 and the navigation unit 5 can be connected to existing assistive devices 1 for disabled persons of different makes, a simple adaptation to an individual user can be achieved and the assistive device 1 be modified each time it is to be used by a new person.

The units 4, 5 are mounted adjacent to the wheelchair 1, for example close to the steering system 2, by means of a suitable type of attachment. If a display 41 for eye control is used, it is mounted where the user can comfortably fix his/her gaze on it, perhaps adjacent to an arm test 14, and if an input apparatus 52 with a touch screen is used, it is fixed in a corresponding position. Thanks to the connection of the units 4, 5 to the steering system 2, they can be supplied with current by the steering system 2, but it is also conceivable with a separate current supply to the units 4, 5.

After installation, the system is ready to be used, so that the user now can be seated in the wheelchair 1 and control the ride in a way adapted to hers or his abilities. If another user is to use the same wheelchair 1, the system with the units 4, 5 can be modified in order to fit the new individual, or be maintained as before if this is more practical. If the system is self learning, data relating to different users can be saved separately, so that the system easily can switch from one user to another without losing this data.

Several types of sensors can be used with the invention for detecting obstacles, determining position and determining speed, among them sonar, lidar, radar, or a camera unit, as well as tachometers adjacent to the wheels 11, or an accelerometer.

The invention is not limited by what has been described hereinabove, but can be varied within the scope of the following claims. For example, it is appreciated that the measured gaze point does not have to be on a data display, but can be somewhere else, or that other assistive devices than a wheelchair are usable with the invention. Numerous other modifications are also possible, as is appreciated by the skilled person.

The invention claimed is:

1. A steering and control system, wherein said system is adapted to be connected to a mobile assistive device for disabled persons in such a way that electronic transfer of information can take place between said steering and control system and said assistive device for disabled persons, wherein said system comprises:
    a control unit for eye control, said control unit for eye control comprising means for detecting a gaze point of a user;
    at least one display provided with at least one symbol field;
    a navigation unit comprising a position unit and being connected to the control unit, the navigation unit being constructed for determining a position of the assistive device relative to an environment; and
    interpreting means for interpreting a position of the measured gaze point within a symbol field as an instruction to the control system, wherein the system is also designed to be adaptable to different control routines, wherein said control unit for eye control further comprises means for image recording adapted to record at least one image of an environment around the assistive device and displaying the image on the display such that the image interacts with the at least one symbol field in such a way that the user can fix a gaze on a direction on the display and see both a symbol indicating a certain direction as well as an image of a portion of the environment in which the assistive device would move if the gaze were fixed on the symbol so that a user can see from the display where the assistive device is moving in the environment without looking up from the display during use.

2. The steering and control system according to claim 1, wherein a separate joy stick unit is provided and that the control of the control system can be switched between the separate joy stick unit and the control unit by means of a switch.

3. The steering and control system according to claim 1, wherein said navigation unit comprises at least one sensor for detecting objects in an environment around the assistive device for disabled persons, and a memory unit which is adapted to identify the position of the assistive device for disabled persons based on the objects detected by said sensor.

4. The steering and control system according to claim 3, wherein said memory unit is further adapted to memorize a number of given positions and to calculate a suitable route from the present position of the assistive device for disabled persons to one of the given positions, and displaying the suitable rout.

5. The steering and control system according to claim 3, wherein said navigation unit is further designed to prevent collision with the objects detected by the sensor by changing a direction of movement and/or a speed of the assistive device for disabled persons.

6. The steering and control system according to claim 3, wherein said navigation unit further comprises a position unit, connected to the memory unit, for determining the position of the control system relative to the environment.

7. The steering and control system according to claim 3, wherein said navigation unit further comprises an input apparatus connected to the memory unit, wherein said input apparatus is adapted to receive instruction about a given position stored in the memory unit.

8. The steering and control system according to claim 7, wherein the navigation unit is further designed to be independently capable of steering an assistive device for disabled persons to a given position, specified by a user by means of the input apparatus.

9. An assistive device for disabled persons for transportation of at least one user, wherein said assistive device for disabled persons is equipped with at least one steering and control system, wherein said system is adapted to be connected to a mobile assistive device for disabled persons, such as a wheelchair or another mobile platform, in such a way that electronic transfer of information can take place between said steering and control system and said assistive device for disabled persons, wherein said system comprises:
 a control unit for eye control, said control unit for eye control comprising means for detecting a gaze point of a user;
 at least one display provided with at least one symbol field;
 a navigation unit comprising a position unit and being connected to the control unit, the navigation unit being constructed for determining a position of the assistive device relative to an environment; and
 interpreting means for interpreting a position of the measured gaze point within a symbol field as an instruction to the control system, wherein the system is also designed to be adaptable to different control routines, wherein said control unit for eye control further comprises means for image recording adapted to record at least one image of an environment around the assistive device and displaying the image on the display such that the image interacts with the at least one symbol field in such a way that the user can fix a gaze on a direction on the display and see both a symbol indicating a certain direction as well as an image of a portion of the environment in which the assistive device would move if the gaze were fixed on the symbol so that a user can see from the display where the assistive device is moving in the environment without looking up from the display during use.

10. A method of operating a steering and control system, wherein said system is adapted to be connected to a mobile assistive device for disabled persons in such a way that electronic transfer of information can take place between said steering and control system and said assistive device for disabled persons comprising:
 providing a control unit for eye control, said control unit for eye control comprising means for detecting a gaze point of a user;
 providing at least one display having at least one symbol field;
 providing means for image recording adapted to record at least one image of an environment around the assistive device and project the at least one image on the display along with the at least one symbol field;
 providing a navigation unit comprising a position unit and being connected to the control unit, the navigation unit being constructed for determining a position of the assistive device relative to an environment;
 providing interpreting means for interpreting a position of the measured gaze point within a symbol field as an instruction to the control system, wherein the system is also designed to be adaptable to different control routines;
 recording and displaying at least one image of the environment around the assistive device along with the at least one symbol field such that the image interacts with the at least one symbol field in such a way that the user can fix a gaze on a direction on the display and see both a symbol indicating a certain direction as well as an image of a portion of the environment in which the assistive device would move if the gaze were fixed on the symbol so that a user can see from the display where the assistive device is moving in the environment without looking up from the display during use; and
 tracking eye movement or location to control movement of the assistive device.

11. The steering and control system according to claim 1, wherein the assistive device for disabled persons is a wheelchair or another mobile platform.

12. The assistive device according to claim 9, wherein the assistive device is a wheelchair or another mobile platform.

* * * * *